(12) United States Patent
Fuß et al.

(10) Patent No.: US 9,676,493 B2
(45) Date of Patent: Jun. 13, 2017

(54) SYSTEM AND METHOD FOR DAMAGE TRACKING AND MONITORING DURING GROUND HANDLING OF AIRCRAFT

(71) Applicants: Airbus Operations GmbH, Hamburg (DE); Airbus S.A.S., Blagnac (FR)

(72) Inventors: Tim Fuß, Hamburg (DE); Diego Alonso-Tabares, Hamburg (DE)

(73) Assignees: AIRBUS OPERATIONS GMBH, Hamburg (DE); AIRBUS S.A.S., Toulouse (FR)

( * ) Notice: Subject to any disclaimer, the term of this patent is extended or adjusted under 35 U.S.C. 154(b) by 0 days.

(21) Appl. No.: 14/993,278

(22) Filed: Jan. 12, 2016

(65) Prior Publication Data

US 2016/0200449 A1    Jul. 14, 2016

(30) Foreign Application Priority Data

Jan. 12, 2015   (EP) .................................... 15150741

(51) Int. Cl.
*G07C 5/00* (2006.01)
*B64D 45/00* (2006.01)
(Continued)

(52) U.S. Cl.
CPC .............. *B64D 45/00* (2013.01); *G06Q 40/00* (2013.01); *G07C 5/008* (2013.01); *G07C 5/085* (2013.01);
(Continued)

(58) Field of Classification Search
None
See application file for complete search history.

(56) References Cited

U.S. PATENT DOCUMENTS

| 5,548,515 A | * | 8/1996 | Pilley | ..................... G01C 23/00 340/961 |
| 6,246,320 B1 | * | 6/2001 | Monroe | ............. B64D 45/0015 340/506 |

(Continued)

FOREIGN PATENT DOCUMENTS

| CN | 102097014 B | 6/2011 |
| EP | 1242987 A1 | 9/2002 |

(Continued)

OTHER PUBLICATIONS

European Patent Office, European Search Report for European Patent Application No. 15150741.5 mailed Jul. 2, 2015.

*Primary Examiner* — Jonathan M Dager
(74) *Attorney, Agent, or Firm* — Lorenz & Kopf, LLC

(57) ABSTRACT

A system for damage tracking and monitoring during ground handling of aircraft includes a ground service communication network configured to transmit communication data between ground support equipment, GSE, and aircraft; a database configured to store configuration data and status data of GSE and aircraft; and a computer-based system configured to communicate with the ground service communication network and the database. The computer-based system is configured to update the configuration data and the status data of GSE and aircraft stored in the database on basis of communication data received from the ground service communication network. The computer-based system is further configured to estimate a damage source among the GSE for a damage inflicted on the aircraft by one of the GSE by correlating damage characteristics of the damage with the configuration data and the status data from the database.

20 Claims, 2 Drawing Sheets

(51) Int. Cl.
*G06Q 40/00* (2012.01)
*G08G 5/00* (2006.01)
*G07C 5/08* (2006.01)
*G01S 13/91* (2006.01)

(52) U.S. Cl.
CPC ....... *G08G 5/00* (2013.01); *B64D 2045/0085* (2013.01); *G01S 2013/916* (2013.01)

(56) References Cited

U.S. PATENT DOCUMENTS

| | | | | |
|---|---|---|---|---|
| 7,002,488 | B2* | 2/2006 | Kohlmeier-Beckmann | B64F 1/36 340/431 |
| 7,176,448 | B2* | 2/2007 | Ogisu | G01M 11/086 250/227.14 |
| 7,298,152 | B1* | 11/2007 | Wilke | G07C 5/0808 324/639 |
| 7,541,944 | B2 | 6/2009 | Konya et al. | |
| 8,594,882 | B2* | 11/2013 | Wilke | G07C 5/008 701/29.1 |
| 9,234,813 | B2* | 1/2016 | Reitmann | G01B 11/16 |
| 9,470,659 | B2* | 10/2016 | Chaume | G01N 29/045 |
| 2002/0120392 | A1* | 8/2002 | Stratton | B64D 1/002 701/120 |
| 2003/0045994 | A1* | 3/2003 | Stratton | B64F 1/002 701/120 |
| 2003/0191564 | A1* | 10/2003 | Haugse | G05B 23/0283 701/29.4 |
| 2004/0008253 | A1* | 1/2004 | Monroe | G08B 13/19641 348/143 |
| 2006/0004499 | A1* | 1/2006 | Trego | B64D 45/00 701/31.4 |
| 2007/0061109 | A1* | 3/2007 | Wilke | G06Q 10/10 702/183 |
| 2007/0265790 | A1* | 11/2007 | Sealing | G01M 5/0033 702/33 |
| 2007/0282541 | A1* | 12/2007 | Griess | H04Q 9/00 702/34 |
| 2008/0167833 | A1* | 7/2008 | Matsen | G01N 29/14 702/122 |
| 2009/0093999 | A1* | 4/2009 | Kearns | G01N 29/4481 702/184 |
| 2011/0087417 | A1* | 4/2011 | Anderson | B60Q 1/48 701/96 |
| 2012/0200433 | A1* | 8/2012 | Glover | G08G 5/065 340/971 |
| 2013/0321169 | A1* | 12/2013 | Bateman | G08G 5/04 340/901 |
| 2015/0170525 | A1* | 6/2015 | Conner | G08G 5/065 701/3 |
| 2016/0054443 | A1* | 2/2016 | Mallaghan | G08G 1/163 701/500 |
| 2016/0351061 | A1* | 12/2016 | Lamkin | G08G 5/065 |

FOREIGN PATENT DOCUMENTS

| | | |
|---|---|---|
| KR | 20130027729 A | 3/2013 |
| WO | 2009075648 A1 | 6/2009 |
| WO | 2014154860 A1 | 10/2014 |
| WO | 2014207558 A2 | 12/2014 |

* cited by examiner

SYSTEM AND METHOD FOR DAMAGE TRACKING AND MONITORING DURING GROUND HANDLING OF AIRCRAFT

CROSS-REFERENCE TO RELATED APPLICATION

This application claims priority to European Patent Application No. 15150741.5, filed Jan. 12, 2015, which is incorporated herein by reference in its entirety.

TECHNICAL FIELD

The embodiments relate to a system and a method for damage tracking and monitoring during ground handling of aircraft.

BACKGROUND

Although applicable to any kind of airborne or landborne vehicle, the present embodiment and the problem on which it is based will be explained in greater detail with reference to a system and a method for damage tracking and monitoring during ground handling of commercial aircraft.

During ground handling of an aircraft, a large variety of ground support vehicles are typically maneuvering in the direct vicinity of the aircraft. On relatively short time scales, the aircraft must be refueled, passengers have to board and/or disembark, cargo must be unloaded, the aircraft must be cleaned and reprovisioned etc. The complex servicing of an aircraft has to be handled not only efficiently but also safely. For this reason, a lot of effort is put into avoiding any inadvertent collision between aircraft and ground support equipment during ground handling. Otherwise significant damage might be inflicted on the aircraft, eventually requiring expensive and time-consuming repair before the aircraft can be returned to service.

This is particularly relevant as formerly metallic parts of the aircraft fuselage are increasingly replaced by non-metallic composite structures. Composite components have the advantage of much lighter weight compared to similarly structured metallic parts. However, in case of metallic fuselages a visual inspection can reveal if a damage occurred which then can trigger an assessment of the damage and, if necessary, a repair effort. In case of composite fuselages, it is more difficult to detect damages as the composite material often does not reveal the damage in form of dents or the like. If an object impacts a composite fuselage, the material tends to flex and return to the initial state. Nevertheless, the impact might have caused internal damage of fibers and resin that may be invisible from the exterior and thus may be "hidden" from visual inspection. Hence, special means need to be implemented for damage detection. In addition, any impact must be reported so that involved parties can be made aware of the damage. It would be helpful if any occurring damage or impact could be backtracked to the perpetrator, e.g. a particular ground support unit.

Various collision prevention or warning systems and methods are known in the art, e.g. as disclosed in prior art documents US 2013/0321169 A1, U.S. Pat. No. 7,541,944 B2 and WO 2009/075648 A1. In addition, damage detection systems are described in the prior art, e.g. in document U.S. Pat. No. 8,594,882 B2 or in particular for structures made from composite materials in document U.S. Pat. No. 7,176,448 B2.

Document CN 102097014 B discloses a flight ground support service commanding and dispatching system. The system can realize the real-time communication of information with a dispatching center by utilizing a broadband wireless communication network so that the dispatching center can monitor all flight support service progresses and service resource positions. Further methods for real-time tracking and management of land-based vehicles on airports are for example disclosed in document EP 1 242 987 A1.

However, there is a need for tracking occurred damages back to the damage source in an efficient and automatized way. This would enable faster assessment of caused damage and the responsible party could be charged.

SUMMARY

It thus is one idea of the present embodiment to provide means of (back-) tracking damage inflicted on aircraft during ground handling by ground support equipment.

A system for damage tracking and monitoring during ground handling of aircraft comprises a ground service communication network configured to transmit communication data between ground support equipment (GSE) and aircraft. The system further comprises a database configured to store configuration data and status data of GSE and aircraft. The system further comprises a computer-based system configured to communicate with the ground service communication network and the database. The computer-based system is configured to update the configuration data and the status data of GSE and aircraft stored in the database on basis of communication data received from the ground service communication network. The computer-based system is further configured to estimate a damage source among the GSE for a damage inflicted on the aircraft by one of the GSE by correlating damage characteristics of the damage with the configuration data and the status data from the database.

Furthermore, a method for damage tracking and monitoring during ground handling of an aircraft comprises transmitting and receiving communication data via a ground service communication network between ground support equipment (GSE), aircraft and a computer-based system. The method further comprises storing and updating configuration data and status data of GSE and aircraft on a database with the computer-based system on basis of the communication data received from the ground service communication network. The method further comprises estimating a damage source among the GSE with the computer-based system for a damage inflicted on the aircraft by one of the GSE by correlating damage characteristics of the damage with the configuration data and the status data from the database.

One idea of the present embodiment is to continuously surveil the environment of an aircraft during ground handling and in particular to track all mobile ground support units in the vicinity of the aircraft. For this, relevant configuration data and status data of GSE is stored in the database and continuously updated via the dedicated communication network. This has the advantage that the mobile environment around the aircraft can be fully reconstructed in case a damage has been inflicted on the aircraft, e.g. in case an impact hit the aircraft. This can be done in real-time or in retrospective, as the required data are fully stored in the database and are at any time retrievable via the computer-based system. In particular, the complete (or partial) history of GSE movement and status data can be stored inside the database, including GSE positions and velocities as a function of time. Hence, damages reported with significant time delay can still be backtracked to the GSE being the potential perpetrator.

As soon as a damage and its characteristics are reported, either by an automatic system, by visual inspection or any other procedure, the computer-based system according to the present embodiment is able to calculate a potential source of damage among the various GSE that were moving in the vicinity of the aircraft when the damage occurred. Based on this information, post event analysis may be started or for example an immediate alert warning may be issued.

According to an embodiment, the system further comprises a damage detection system configured to detect damage inflicted on aircraft and to provide damage characteristics of the detected damage. Herein the computer-based system may further be configured to communicate with the damage detection system and to estimate a damage source among the GSE for a damage detected by the damage detection system by correlating damage characteristics of the detected damage provided by the damage detection system with the configuration data and the status data from the database. In this embodiment, a damage is detected automatically by the dedicated damage detection system. Hence, damage tracking is advantageously possible in a self-controlled and automatic way. The damage detection system may not only provide information on whether a damage occurred or not. In addition, the system may also provide detailed information about the damage, like for example time and location of the damage, the affected area of the damage, the damage potential and the type of damage etc. All these information can be taken into account by the computer-based system when tracking the damage source.

Accordingly, the method for damage tracking may further comprise detecting damage inflicted on aircraft with a damage detection system and providing damage characteristics of the detected damage. Herein transmitting and receiving communication data via the ground service communication network may include transmitting and receiving communication data from and to the damage detection system. Further, estimating the damage source among the GSE with the computer-based system may include estimating the damage source among the GSE for a damage detected by the damage detection system by correlating damage characteristics of the detected damage provided by the damage detection system with the configuration data and the status data from the database.

The damage detection system may be aircraft based, ground based or both. For example, the damage detection system may installed on individual aircraft, which then communicate with the damage tracking and monitoring system. In addition or alternatively, the damage detection system may also be ground based, e.g. it can be part of a general ground-based surveillance system. In principle, the system according to the present embodiment may be configured in a very general way to be able to handle various different aircraft-based damage detection systems. Thus, for example, redundant information on the damage can be considered by the damage tracking and monitoring system, e.g. per default only the ground-based surveillance may be used and only in particular cases, if necessary and if available, additionally aircraft-based information may be combined with the ground-based data in order to improve the calculations and arrive at conclusive results.

The damage detection system may further be configured to detect impacts on aircraft. The system according to the present embodiment can work with various damage detection systems. In one possible advantageous embodiment, the damage detection system is able to detect impacts and further able to estimate, for example, the affected area and the damage potential of an impact. However, in more simple versions, the damage detection system may only be able to provide information on the location of an impact without being able to sense the strength of the impact and without being able to provide any detailed information about the actual damage potential. In this case, the damage detection system only senses that something hit the aircraft. Based on this information, the damage tracking and monitoring system then estimates a source among the GSE.

The damage detection system may comprise a plurality of acceleration sensors placed on aircraft for detecting impacts. The acceleration sensors may be for example distributed over the fuselage of an aircraft in a web-like configuration. Alternatively, already a smaller number of well-placed and precise sensors may be sufficient to cover a whole aircraft. When an object hits the aircraft in the vicinity of one of such sensors, the respective sensor will detect the shock from the impact and may provide an estimation of the impact location, as well as possibly the affected area and/or the strength of the impact.

The damage detection system may further be configured to evaluate impact damage on structural components formed from composite material. As detailed above, a damage detection system is particularly relevant in case of structures made from composite materials, e.g. the fuselage of a modern aircraft. Here, visual inspection or the like will not necessarily provide a complete picture of the damage or if there was a damage at all. Long-term damages may have been inflicted on the structure of the aircraft that are neither visible nor easy to assess. A sophisticated damage detection system may help to save significant maintenance efforts and costs.

In one embodiment, the damage detection system comprises a plurality of piezoelectric transducers placed on the composite structures for evaluating impact damage on the composite structures by actuating and sensing elastic wave propagation in the composite structures. This embodiment is one example for an implementation of a damage detection system. The piezoelectric elements are placed on various parts of a structure, e.g. the fuselage of an aircraft, and are configured to excite elastic waves in the material. While propagating through the material, these waves are affected by discontinuities in the material, like for example ruptures, deformations or displacements caused by an impact. Hence, the propagation is affected in a very specific way and the changes in the propagated wave spectrum can be measured and analyzed to evaluate if an damage occurred or not. This damage detection may for example cover the fuselage of an aircraft partially or completely. In this way, any possible impact on the fuselage may be detected and assessed electronically.

According to another embodiment, the configuration data include aircraft characteristics and/or GSE characteristics. In particular, the configuration data may include type, mass, and/or shape and/or allowed paths of GSE and/or aircraft. For example, the system can consider information about the shape and size of the aircraft. Then an estimation of a damage source can be derived by analyzing which GSE were moving around the aircraft. In particular, the system knows where each particular GSE has been at one particular instance in time. Based on these information, the system may be able to narrow the scope to one particular GSE as the damage source. Failing at this, e.g. because two different GSE have been in the vicinity of the damage area at the time of the damage, the system may consider additional information for clarifying the situation. Alternatively, the system may consider information from an aircraft-based damage detection on the type of damage and then compare this with the type of the two GSE. The damage potential could be derived from a combination of type and velocity of a GSE and the reported or detected impact shock of the damage. This could be scaled with an estimated distance between the damage sensor and the impact area or the particular position of the GSE at the time of the damage. Damages often originate from GSE leaving their allowed paths, hence it may be helpful for tracking and preventing damages to take into account available information on the positions where GSE are supposed to be.

The status data may include speed, position, orientation, and/or condition and/or ground attitude of GSE and/or aircraft. For the assessment of a damage it might be relevant in what orientation and condition a GSE was at the location of the damage at the time when the damage occurred. If the damage was inflicted at a certain height to the fuselage of the aircraft it would be relevant to know if the suspected GSE was on the ground or in a lifted position/state. Further, the height and general shape of the GSE would be relevant, for example. In addition, aircraft status data may be relevant, like for example if the passenger and/or cargo doors are opened or closed, the status of the servicing panel etc.

The damage characteristics may include time, location, type, size, affected area on the aircraft, and/or potential of the damage. Depending on the specific technology and sophistication of the damage detection system, various damage characteristics may be evaluated and measured either alone or in combination. A simple but cost-efficient visual ground-based system may only provide time and location of an impact. However an aircraft-based system with piezoelectric transducers may be able to provide detailed information on the affected area and the damage potential. Hence, the computer-based system may combine general information of the ground-based system with the detailed information of the aircraft-based system. For example, the detection of an impact by the ground-based system may trigger the computer-based system to start a damage tracking algorithm, which then acquires detailed information about the damage from the aircraft-based system of the affected aircraft.

According to another embodiment of the method, detecting damage inflicted on aircraft with the damage detection system may include estimating an approximate damage area on the aircraft. The damage area may be estimated indirectly, for example, by combining information about the types and locations of GSE moving around the aircraft at the time of a reported damage. Alternatively or additionally, the damage area may also be detected directly by a damage detection system.

Detecting damage inflicted on aircraft with the damage detection system may further include calculating a damage potential of the damage. Also in this case, the damage potential may be evaluated directly and/or indirectly. The damage potential may be estimated on basis of the relevant GSE, its type, shape, orientation, speed, or mass etc., in the vicinity of the damage at the time of the damage. Or the damage potential may be estimated directly on basis of a measurement of a damage detection system with respective sensors.

According to yet another embodiment, the method comprises assessing an impact of the damage on aircraft operations and requesting an inspection of the aircraft, if necessary. In this embodiment, the system could for example send out a warning to the aircraft operators and the airport personal that significant damage occurred to an aircraft. Hence, the aircraft could be withdrawn and sent into maintenance/repair.

According to yet another embodiment, the method comprises analyzing the configuration data and the status data of GSE and aircraft and sending an alert warning if the configuration data and/or status data of GSE and/or aircraft are not conforming to pre-defined presets. Thus, if the known configuration and status data indicate that GSE and/or aircraft behave outside of certain pre-defined safety regulations, a warning may be send to aircraft operators or handlers. For example, the damage tracking and monitoring system may continuously evaluate the configuration and status data for this.

BRIEF DESCRIPTION OF THE DRAWINGS

The various embodiments will hereinafter be described in conjunction with the following drawing figures, wherein like numerals denote like elements, and.

The accompanying drawings are included to provide a further understanding of the present embodiment and are incorporated in and constitute a part of this specification. The drawings illustrate the embodiments of the present embodiment and together with the description serve to explain the principles of the embodiment. Other embodiments of the present embodiment and many of the intended advantages of the present embodiment will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Although specific embodiments are illustrated and described herein, it will be appreciated by those of ordinary skill in the art that a variety of alternate and/or equivalent implementations may be substituted for the specific embodiments shown and described without departing from the scope of the present embodiment. Generally, this application is intended to cover any adaptations or variations of the specific embodiments discussed herein.

Figure 1:
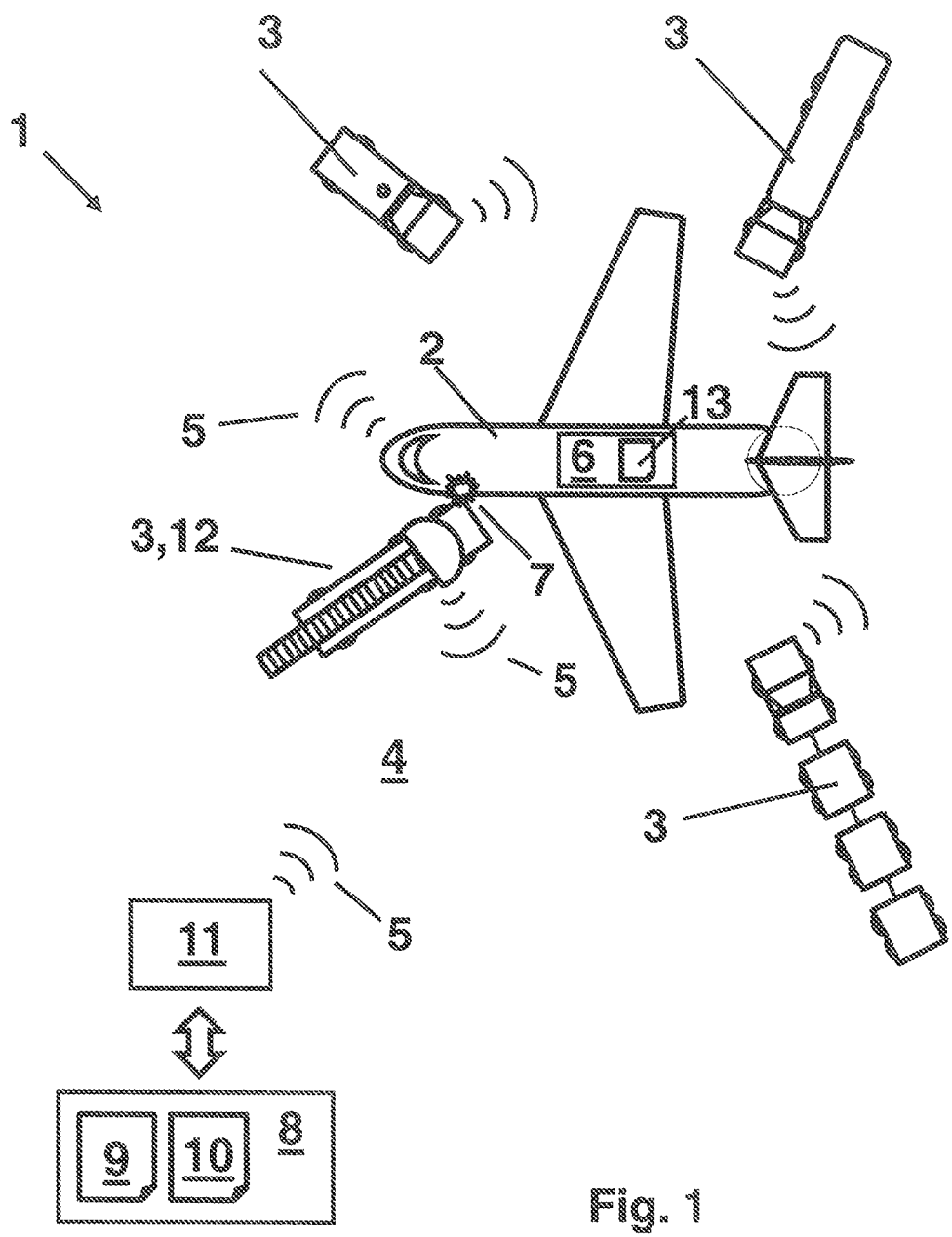
FIG. 1 schematically illustrates a system for damage tracking during ground handling of aircraft according to an embodiment.

FIG. 1 schematically illustrates a system for damage tracking during ground handling of aircraft according to an embodiment.

In FIG. 1 reference sign 1 denotes the damage tracking and monitoring system. The damage tracking and monitoring system 1 may be for example installed at an airport in the servicing area by a terminal, e.g. on a ramp. In FIG. 1 various mobile ground support equipment (GSE) 3 support the operations of a grounded aircraft 2. GSE in the meaning of the present embodiment can be for example electrically powered units or non-powered units. The former comprise refuelers, loaders, transporters, buses for passengers, service vehicles, mobile passenger boarding ramps or steps, deicing vehicles, belt loaders, and various transporters, trucks and tugs for different purposes like transporting baggage or equipment. Non-powered units for example comprise dollies or baggage carts.

The damage tracking and monitoring system 1 in FIG. 1 comprises a computer-based system 11 that may be installed for example in the tower of the airport or the terminal. The damage tracking and monitoring system 1 provides a ground service communication network 4 that is configured to transmit communication data 5 between the GSE 3, the aircraft 2 and the computer-based system 11. The ground service communication network 4 may be for example a broadband wireless network or the like.

The communication data 5 can comprises various kinds of digital communication data, but in particular configuration data 9 and status data 10 of GSE 3 and aircraft 2. The communication data 5 can be transmitted and received by all units being connected to the ground service communication network 4, that is, the GSE 3, the aircraft 2, and the computer-based system 11. In addition, operators, ground service personal, and various vehicles may be equipped with the necessary devices in order to communicate with the ground service communication network 4. In the present embodiment, all GSE 3 and aircraft 2 report their activity, i.e. their speed, position etc., via the ground service communication network 4 to the computer-based system 11.

Further, the damage tracking and monitoring system 1 comprises a database 8 configured to store the configuration data 9 and the status data 10 of GSE 3 and aircraft 2. The computer-based system 11 is able to continuously access the database 8 and update or read the configuration data 9 and the status data 10. The computer-based system 11 is particularly configured to continuously receive communication data 5 from the GSE and the aircraft 2 and on this basis update the configuration data 9 and the status data 10 in the database 8.

The configuration data 9 may include characteristics of the aircraft 2 and the GSE 3, e.g. type, mass, shape, configuration etc., as well as additional data like for example allowed paths of GSE 3 etc. The status data 10 comprise but are not limited to speed, position, orientation, and/or condition of the GSE 3. Speed and position can be momentaneous values, average values etc.

The damage tracking and monitoring system 1 further comprises a damage detection system 6. In this exemplary embodiment, the damage detection system 6 is incorporated into the aircraft 2 and configured to detect damage 7 inflicted on the aircraft 2. Based on the detected damage 7 the damage detection system 6 is able to provide damage characteristics 13 of the damage 7. Damages 7 within the meaning of the embodiment may be for example impacts on the fuselage of the aircraft 2.

In the depicted embodiment, the damage detection system 6 includes a plurality of piezoelectric transducers (not depicted) that are placed on the fuselage of the aircraft 2. The fuselage of the aircraft may be formed from a composite material, e.g. from carbon fiber reinforced plastic. The piezoelectric transducers are configured to actuate and sense elastic wave propagation in the fuselage of the aircraft 2 for evaluating impact damage 7 on the composite material of the fuselage.

The computer-based system 11 is configured to communicate with the damage detection system 6. For this, a direct way may be provided, e.g. directly via the ground service communication network 4, or an indirect way, via the aircraft 2 into which the damage detection system 6 is incorporated. The computer-based system 11 is thus able to access the damage characteristics 13 provided by the damage detection system 6 for a specific damage 7. The damage characteristics 13 can comprise relevant information about a damage 7, like the time, location, type, size, affected area, or general potential of the damage 7.

The computer-based system 11 is configured to estimate a damage source 12 among the GSE 3 for a reported or detected damage 7 on the aircraft 2. For example, the damage 7 may occur because a passenger boarding stairs vehicle 3, 12 accidentally hits the aircraft 2. This damage 7 may be detected for example by the damage detection system 6 of the aircraft 2. In principle, in other embodiments, the airport may be equipped with a ground-based damage detection system 6 (e.g. a visual system based on high-resolution optical cameras or the like) that may also be able to detect such a damage 7. Alternatively or additionally, a damage 7 may also be reported by manual inspection of airport service personal. In any case, the computer-based system 11 has to be provided with damage characteristics 13, be it in an automatic way via a ground-based or aircraft-based damage detection system 6 or by manual input from a service operator. On basis of the damage characteristics 13, the computer-based system 11 is then able to calculate an estimation for a potential damage source 12 among the GSE 3. This is done by correlating the damage characteristics 13 of the damage 7 with the configuration data 9 and the status data 10 stored on the database 8.

In the process of estimating the damage source 12 the damage tracking and monitoring system 1 can estimate the source of the damage, estimate an approximate damage area, and calculate the damage 7 potential. In principle, some of these aspect can be handled by the aircraft-based damage detecting system 6. However in general, more general damage tracking and monitoring systems 1 can comprise ground-based and aircraft-based damage detection systems 6 which can be used together for an optimal assessment and tracking of any occurring damage 7. The damage tracking and monitoring system 1 can further be configured to assess the impact of the damage 7 on aircraft 2 operations. If necessary, inspection or maintenance of the aircraft 2 can be requested based on the assessment of the damage tracking and monitoring system 1.

Figure 2:
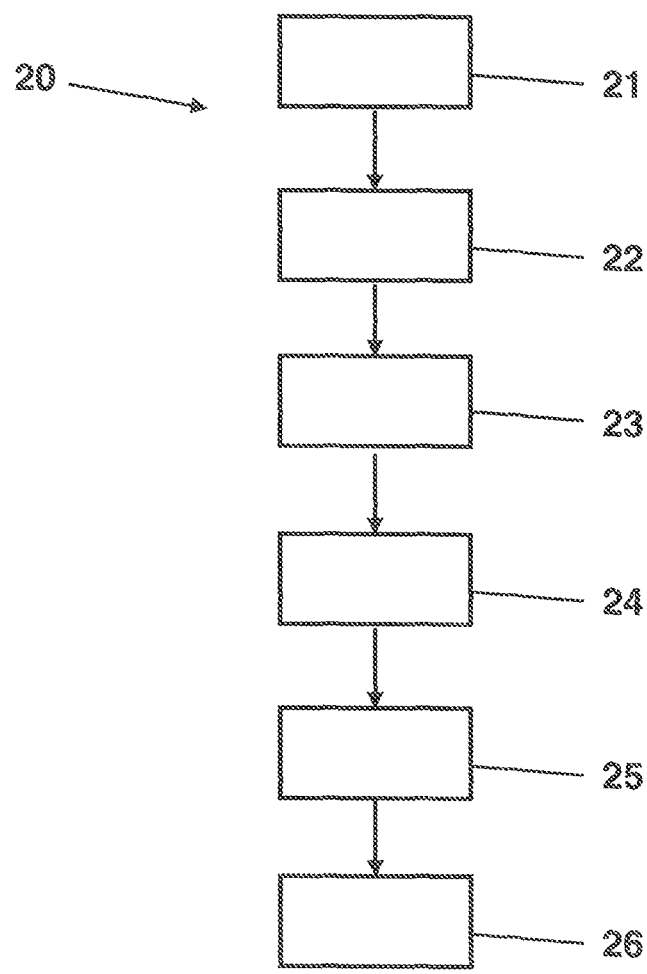
FIG. 2 schematically illustrates a method for damage tracking during ground handling of aircraft according to another embodiment.

FIG. 2 schematically illustrates a method 20 for damage tracking during ground handling of aircraft 2 according to another embodiment.

The method 20 comprises at 21 transmitting and receiving communication data 5 via a ground service communication network 4 between GSE 3, aircraft 2 and a computer-based system 11. The method 20 further comprises at 22 storing and updating configuration data 9 and status data 10 of GSE 3 and aircraft 2 on a database 8 with the computer-based system 11 on basis of the communication data 5 received from the ground service communication network 4. The method 20 further comprises at 23 detecting damage 7 inflicted on aircraft 2 with a damage detection system 6 and providing damage characteristics 13 of the detected damage 7. Consequently, transmitting and receiving communication data 5 via the ground service communication network 4 includes transmitting and receiving 21 communication data 5 from and to the damage detection system 6. The method 20 further comprises at 24 estimating the damage source 12 among the GSE 3 with the computer-based system 11 for a damage 7 detected by the damage detection system 6 by correlating damage characteristics 13 of the detected damage 7 provided by the damage detection system 6 with the configuration data 9 and the status data 10 from the database 8. This embodiment of the method 20 further includes at 25 assessing an impact of the damage 7 on aircraft 2 operations and requesting an inspection of the aircraft 2, if necessary. In addition, this embodiment of the method 20 further includes at 26 analyzing the configuration data 9 and the status data 10 of GSE 3 and aircraft 2 and sending an alert warning if the configuration data 9 and/or status data 10 of GSE 3 and/or aircraft 2 are not conforming to pre-defined presets.

Detecting damage 7 inflicted on aircraft 2 with the damage detection system 6 optionally further includes estimating an approximate damage area on the aircraft 2 and calculating a damage potential of the damage 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A system for damage tracking and monitoring during ground handling of aircraft, comprising:
   a ground service communication network configured to transmit communication data between ground support equipment (GSE) and aircraft;
   a database configured to store configuration data and status data of GSE and aircraft; and
   a computer-based system configured to communicate with the ground service communication network and the database;
   wherein the computer-based system is configured to update the configuration data and the status data of GSE and aircraft stored in the database on basis of communication data received from the ground service communication network; and
   wherein the computer-based system is configured to estimate a damage source among the GSE for a damage inflicted on the aircraft by one of the GSE by correlating damage characteristics of the damage with the configuration data and the status data from the database.

2. The system according to claim 1, further comprising:
   a damage detection system configured to detect damage inflicted on aircraft and to provide damage characteristics of the detected damage,
   wherein the computer-based system is further configured to communicate with the damage detection system and to estimate a damage source among the GSE for a damage detected by the damage detection system by correlating damage characteristics of the detected damage provided by the damage detection system with the configuration data and the status data from the database.

3. The system according to claim 1, wherein the damage detection system is aircraft based and/or ground based.

4. The system according to claim 1, wherein the damage detection system is configured to detect impacts on aircraft.

5. The system according to claim 4, wherein the damage detection system comprises a plurality of acceleration sensors placed on aircraft for detecting impacts.

6. The system according to claim 4, wherein the damage detection system is configured to evaluate impact damage on structural components formed from composite material.

7. The system according to claim 6, wherein the damage detection system comprises a plurality of piezoelectric transducers placed on the composite structures for evaluating impact damage on the composite structures by actuating and sensing elastic wave propagation in the composite structures.

8. The system according to claim 1, wherein the configuration data includes type and/or mass and/or shape and/or allowed paths of GSE and/or aircraft.

9. The system according to claim 1, wherein the status data includes speed and/or position and/or orientation and/or condition and/or ground attitude of GSE and/or aircraft.

10. The system according to claim 1, wherein the damage characteristics include time and/or location and/or type and/or size and/or affected area on the aircraft and/or potential of the damage.

11. A method for damage tracking and monitoring during ground handling of an aircraft, comprising:
    transmitting and receiving communication data via a ground service communication network between ground support equipment (GSE) and a computer-based system;
    storing and updating configuration data and status data of GSE and aircraft on a database with the computer-based system on basis of the communication data received from the ground service communication network; and
    estimating a damage source among the GSE with the computer-based system for a damage inflicted on the aircraft by one of the GSE by correlating damage characteristics of the damage with the configuration data and the status data from the database.

12. The method according to claim 11, further comprising:
    detecting damage inflicted on aircraft with a damage detection system and providing damage characteristics of the detected damage,
    wherein transmitting and receiving communication data via the ground service communication network includes transmitting and receiving communication data from and to the damage detection system, and
    wherein estimating the damage source among the GSE with the computer-based system includes estimating the damage source among the GSE for a damage detected by the damage detection system by correlating damage characteristics of the detected damage provided by the damage detection system with the configuration data and the status data from the database.

13. The method according to claim 12, wherein detecting damage inflicted on aircraft with the damage detection system includes estimating an approximate damage area on the aircraft and/or calculating a damage potential of the damage.

14. The method according to claim 11, further comprising:
    assessing an impact of the damage on aircraft operations and requesting an inspection of the aircraft if necessary.

15. The method according to claim 11, further comprising:
    analyzing the configuration data and the status data of GSE and aircraft and sending an alert warning if the configuration data and/or status data of GSE and/or aircraft are not conforming to pre-defined presets.

16. A system for damage tracking and monitoring during ground handling of aircraft, comprising:
a ground service communication network configured to transmit communication data between ground support equipment (GSE) and aircraft;
a database configured to store configuration data and status data of GSE and aircraft; and
a computer-based system configured to communicate with the ground service communication network and the database;
wherein the computer-based system is configured to update the configuration data and the status data of GSE and aircraft stored in the database on basis of communication data received from the ground service communication network;
wherein the computer-based system is configured to estimate a damage source among the GSE for a damage inflicted on the aircraft by one of the GSE by correlating damage characteristics of the damage with the configuration data and the status data from the database; and
a damage detection system configured to detect damage inflicted on aircraft and to provide damage characteristics of the detected damage,
wherein the computer-based system is further configured to communicate with the damage detection system and to estimate a damage source among the GSE for a damage detected by the damage detection system by correlating damage characteristics of the detected damage provided by the damage detection system with the configuration data and the status data from the database.

17. The system according to claim 16,
wherein the damage detection system is aircraft based and/or ground based; and
wherein the damage detection system is configured to detect impacts on aircraft.

18. The system according to claim 17,
wherein the damage detection system comprises a plurality of acceleration sensors placed on aircraft for detecting impacts; and
wherein the damage detection system is configured to evaluate impact damage on structural components formed from composite material.

19. The system according to claim 18,
wherein the damage detection system comprises a plurality of piezoelectric transducers placed on the composite structures for evaluating impact damage on the composite structures by actuating and sensing elastic wave propagation in the composite structures; and
wherein the configuration data includes type and/or mass and/or shape and/or allowed paths of GSE and/or aircraft.

20. The system according to claim 19,
wherein the configuration data includes type and/or mass and/or shape and/or allowed paths of GSE and/or aircraft;
wherein the status data includes speed and/or position and/or orientation and/or condition and/or ground attitude of GSE and/or aircraft; and
wherein the damage characteristics include time and/or location and/or type and/or size and/or affected area on the aircraft and/or potential of the damage.

* * * * *